CHURCHILL & BREWER.
Wheel-Cultivator.
No. 50,453
Patented Oct. 17, 1865.
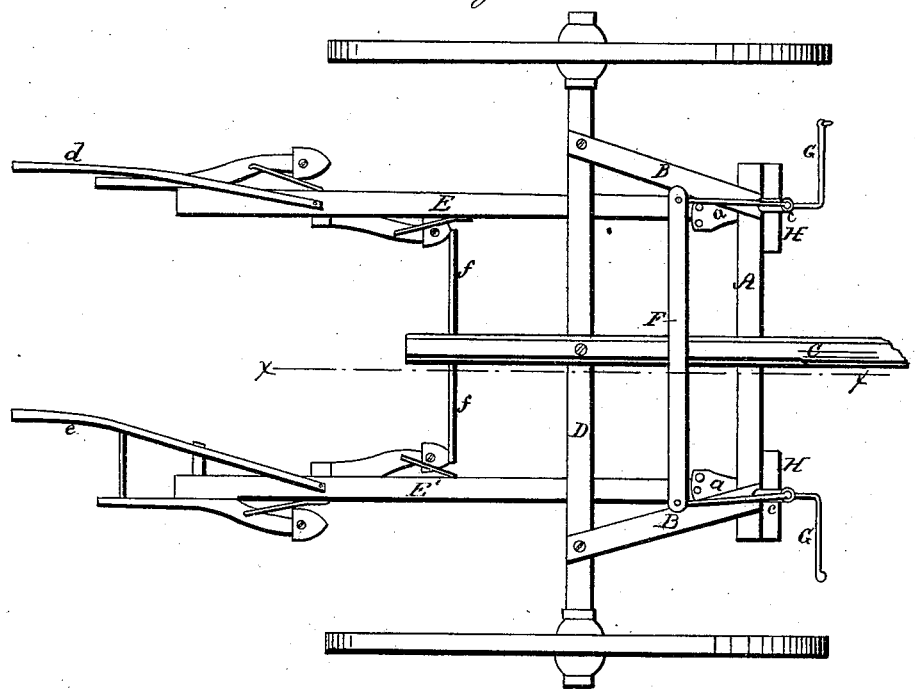
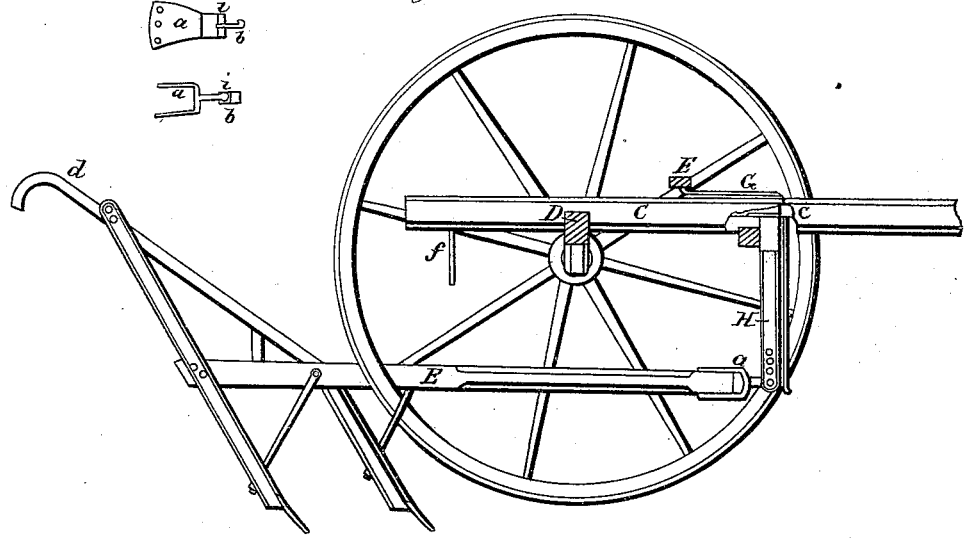
Witnesses:
Thomas J Gardner
Inventor:
J. C. Brewer
D. Churchill

UNITED STATES PATENT OFFICE.

DANL. CHURCHILL AND S. C. BREWER, OF IONIA, ILLINOIS.

IMPROVEMENT IN CULTIVATORS.

Specification forming part of Letters Patent No. 50,453, dated October 17, 1865.

*To all whom it may concern:*

Be it known that we, DANIEL CHURCHILL and SAMUEL C. BREWER, of Ionia, in the county of Warren and State of Illinois, have invented certain new and useful Improvements in Cultivators; and we do hereby declare that the following is a full, clear, and exact description thereof, reference being had to the accompanying drawings, and to the letters of reference marked thereon, making part of this specification, similar letters in the different figures indicating corresponding parts.

Figure 1 is a plan view, and Fig. 2 a vertical longitudinal section of the same, taken in the line $x$ $x$ of Fig. 1; Fig. 3, views of a portion detached.

Our invention consists in a novel construction and arrangement of the draft-rods and evener, and also in novel method of connecting the draft-rods to the plow-beams, and in a peculiarly-constructed clevis for this purpose.

To enable others skilled in the art to construct and use the same, we will proceed to describe it.

We construct a frame consisting of the two side pieces, B, attached rigidly to the axle D at their rear ends, and united at their front end by the bar or cross-piece A, which is firmly bolted thereto. A tongue, C, is rigidly bolted to the axle D and cross-piece A, the rear end of the tongue extending back of the axle some distance, as shown in the drawings. At the front of this frame two pendants, H, are firmly bolted in the position shown in Fig. 2. The wheels thus constructed is mounted on two large wheels, which elevate it sufficiently to pass over corn after it has attained a growth of several feet.

Two plow-beams, E and E', having two cultivator-shovels attached to each, are placed underneath the frame and attached to the pendants by means of the clevis $a$, as shown in the drawings. The handle $d$ attached to the beam E is curved to the left or outward, while the handle $e$ attached to the beam E' is curved inward, which also throws it to the left of its beam, by which means the operator is enabled to hold the handles and walk to the left of the row, which is in the center under the tongue, in the process of cultivating the crops.

The clevis $a$, by which the plow-beams are attached at their front ends to the pendants H and the draft-rod G, is constructed of the form shown in Fig. 3, in which both a plan and side view is shown. The rear portion consists of two broad flanges, made of proper size to embrace the end of the beam between them, and are pierced with a series of holes for adjusting the beams to the right or left, as occasion may require. From the front of these flanges a narrow portion extends forward a short distance, and has a hole, $i$, for a bolt to pass through, for the purpose of connecting the clevis to the pendant H of the frame, which is slotted at its lower end to receive the narrow portion of the clevis, as shown in Fig. 2. Another part, $b$, extends still farther forward, its body being turned so as to be at a right angle to the plane of $a$, as clearly shown in Fig. 3. At its forward extremity this extension $b$ is provided with an eye or hole of sufficient size to receive the draft-rod G, as shown in Fig. 2.

The draft-rods G, of which there are two—one at each front corner of the frame—consist of rods of round iron bent as shown in Figs. 1 and 2. The upper portions of these rods extend back over the frame, as shown, and are pivoted at their rear ends to the cross-bar F. At the upper front corners of the frame they pass loosely through the brackets $e$, bolted firmly to the frame, from whence they extend down in front of and parallel to the pendants H, passing loosely through the eye of $b$, then bend at a right angle, extending slightly forward, when they are again bent at a right angle outward, where they terminate in a hook or eye, to which the single-tree is attached.

The pendant H is pierced with a series of holes, by which the front end of the beams may be adjusted vertically, as desired.

To the rear portion of the tongue behind the axle a rod, $f$, is attached and projects on both sides, as shown in Fig. 1. This rod is curved downward towards its extremities, and terminates at each end in a hook, upon which the plows are suspended when not in use, or when the cultivator is being conveyed to and from the field.

By the arrangement of the draft-rods and the manner of attaching the plows thereto it will be observed that the draft is brought directly upon the plow-beams and not on the frame, the office of the pendants being simply to keep the plows properly adjusted laterally and vertically.

Having thus described our improvements, what we claim is—

1. The combination and arrangement of the draft-rods G, the bar F, clevis $a$, and slotted pendant H, as and for the purpose set forth.

2. The combination of the plow-beams E, clevis $a$, and slotted pendant H, when arranged to operate as shown and described.

DAN. CHURCHILL.
     S. C. BREWER.

Witnesses:
 GEO. I. BERGEN,
 S. N. GROSE.